Sept. 22, 1959 U. TUCHEL 2,905,922
COUPLINGS FOR ELECTRIC CABLES, CONDUCTORS AND THE LIKE
Filed Oct. 11, 1954 2 Sheets-Sheet 1
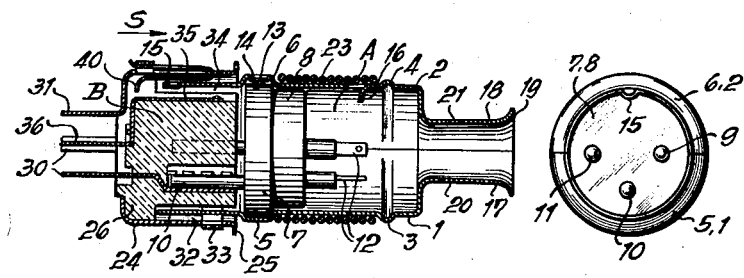
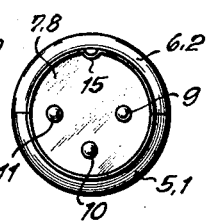
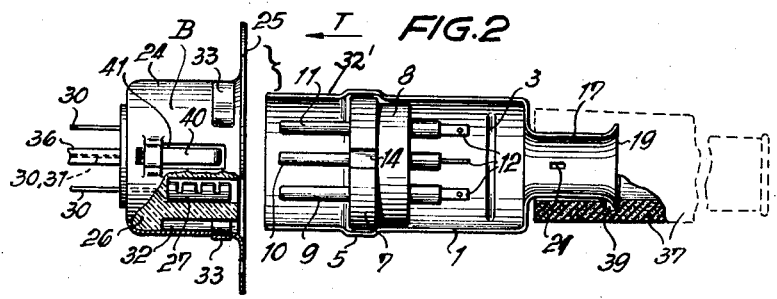
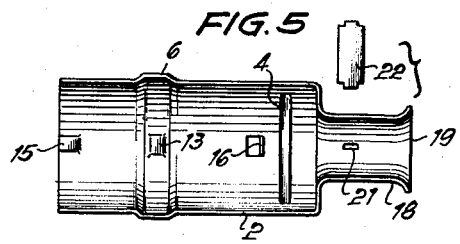
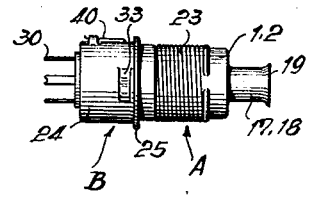
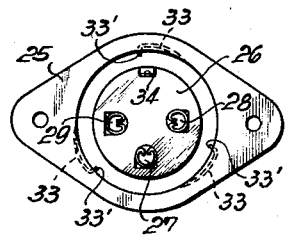
INVENTOR
ULRICH TUCHEL Sept. 22, 1959 U. TUCHEL 2,905,922
COUPLINGS FOR ELECTRIC CABLES, CONDUCTORS AND THE LIKE
Filed Oct. 11, 1954 2 Sheets-Sheet 2

INVENTOR
ULRICH TUCHEL

United States Patent Office 2,905,922
Patented Sept. 22, 1959

2,905,922
COUPLINGS FOR ELECTRIC CABLES, CONDUCTORS AND THE LIKE

Ulrich Tuchel, Heilbronn am Neckar, Germany

Application October 11, 1954, Serial No. 461,569

Claims priority, application Germany June 2, 1954

7 Claims. (Cl. 339—141)

This invention concerns two-part couplings for electric cables, conductors, and the like.

It is an object of the present invention to provide means affording an elastic connection of sections of which the housing of one of the coupling parts consists, to thereby maintain said sections in assembled condition and against axial and radial displacements.

It is another object of the present invention to provide means facilitating ready assembly and disassembly of the housing sections without the employment of any tools by the operator.

It is a further object of the present invention to provide means leading to an efficient coupling structure which has only a few parts, is capable of being mass produced, complies with safety standards, and withstands the stresses imposed by continued use.

Still another object of the present invention is to provide means conducive to the production of a sturdy coupling structure, the dimensions and weight of which can be kept relatively small so that it may lend itself to a great number of applications in connection with precision instruments and other apparatus especially of the type employed in automotive vehicles.

Yet a further object of the present invention is to provide means facilitating manipulation of the coupling parts for connection and disconnection of said parts, to thereby speedily and accurately guide contact portions of the coupling parts to operative position.

More specifically the invention resides in the construction of a sectional housing for one of the coupling parts, the axially divided housing being held together against radial displacement by means of an elastic element, for instance, a resilient ring or a coil spring arranged on the housing between axially spaced flanges or abutments, which elastic element also serves to hold the parts of the housing against axial displacement relative to one another. The use of such a resilient element, especially a coil spring, as the means for holding the housing parts together, permits an easy dismantling and assembling of the coupling means without any tools. Even though such an element holds the housing parts very securely in radial direction and preferably also against relative axial displacement, it is easily mounted on or removed from said housing.

To mount a coil spring on the housing, the spring is rotated like a screw so that its diameter is elastically enlarged. To remove the spring, it is given one or two turns like a screw over the flange or abutment which holds it in a fixed position, whereafter it can be pulled off the housing by being elastically deformed in the same manner.

In modifications employing a coil spring, the turns of the spring make the housing grippable, so that special roughening or knurling of the housing is not necessary in order to permit easy withdrawal of the plug member from the socket member of the coupling, of which the latter consists.

When a resilient ring is to serve as the elastic element, several modifications are possible, depending on whether a split or closed ring is used. In each case, the outer surface of the ring is roughened to provide a good gripping surface. If a split ring is used, then the slot should preferably run at an angle to the longitudinal axis of the ring in such a manner that a clockwise rotation causes an expansion of the ring. If a closed ring is used, then its elasticity can be employed by means of radially inwardly bent tongues or ribs, the ring itself thus having an inner diameter greater than the outer diameter of the housing on which it is mounted. Only the tongues or ribs contact the housing as long as the entire ring is made of resilient metal and not of some extremely elastic material, for instance rubber-like, artificial plastics or the like.

The construction according to the invention is simple and inexpensive and is adaptable for couplings of very small dimensions. This has great importance for many applications in which light weight is of prime importance, for instance, in electronic devices and portable, aeronautical, meteorological, or similar instruments, because reduction of dimensions is one of the prime requisites for the attainment of minimum weight.

In order to provide small, light, and inexpensively constructable elements it is advantageous to stamp or draw the housing sections of the coupling elements out of one piece of sheet metal. The housing sections are preferably provided near each end with a ridge-like expansion forming an annular abutment. The abutment adjacent one end of the housing, preferably that at which the cable is inserted, is so small in the radial direction that a resilient element can easily by pushed or threaded thereover, while the other expansion forms a circular groove on the internal surface of the housing which receives an enlargement of a contact body constructed out of insulating material, thereby fixing the axial position of the body in the housing.

The coupling can be constructed for unipolar or multipolar operation. Especially if the dimensions of the coupling are small to transmit small currents with a minimum of contact resistance, it is advantageous to construct all contact sleeves in the bodies as spring members or tongues having the contact providing surfaces running parallel to the direction of insertion of the prongs into said sleeves.

Further advantages and important characteristics of the invention will become evident from the following description of several embodiments of the invention when read in conjunction with the accompanying claims and drawings in which:

Fig. 1 is a sectional view through a two-part coupling embodying the invention;

Fig. 2 shows both coupling parts separated, in particular a top view of the plug member showing the upper housing part, and a partially sectional top view of the socket member;

Fig. 3 is a front view of the plug member taken in the direction of the arrow S of Fig. 1;

Fig. 4 is a front view of the socket member taken in the direction of arrow T in Fig. 2;

Fig. 5 is a top view of a housing section of the plug member and a view of a related insert element;

Fig. 6 is a view of the connected coupling as in use;

Figure 7:
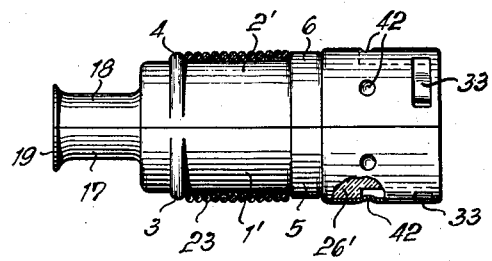
Fig. 7 shows a view partially in section of a socket-like coupling element constructed as a movable part.

Referring now more particularly to Figs. 1 to 6, the coupling comprises a plug-like member A and a socket-like member B forming a fixed part of an instrument panel. Part A comprises a metallic housing which consists of two sections 1 and 2 jointed together. Except for small variations which are set forth below, these housing sections are identical and comprise substantially semi-cylindrical parts drawn or stamped out of metal. A suitable material for this purpose is sheet brass, which at least on its inner surface should be provided with a coating of tin, so that shielding elements can be soldered to the inner surface of the housing. Near the inlet for the cable these housing sections are provided with small peripheral expansion portions 3 and 4 which form, when the housing sections are placed together, a circumferential ridge or abutment. Spaced therefrom are wider peripheral expansion portions 5 and 6 which, when the housing is formed by the assembled sections, provide a second circumferential abutment and also a corresponding groove on the inner surface of the housing. The major portion of the housing is, thus, encompassed between these circumferential abutments. Into this groove fits a ridge 7 of a contact body 8 made out of insulating material which is mounted in the housing.

Groove 5 fixes the axial location of the contact body 8 relative to the housing when the body is placed therein. Prongs 9, 10 and 11 are fixed in the contact body in any suitable manner and are provided at their rear ends with terminals 12. Instead of three prongs, as shown in this embodiment, there can be provided more or fewer prongs, as for instance, a single prong in the middle of contact body 8 made out of ceramic material for high frequency applications. Instead of round prongs, of course, knifelike contacts can be used.

When more than one prong is employed, provision must be made for maintaining the prongs in alignment with the appropriate recesses. Therefore, not only the angular relations of coupling parts A and B relative to one another but also the angular position of the contact body 8 in the housing sections 1 and 2 must be fixed. The latter object is attained through a provision of a deformation such as an inwardly extending depression 13 in the circular groove 6 of housing part 2 which fits into a corresponding deformation 14 in the ridge 7 of the contact body 8. The housing section 2 is also provided adjacent the insertion end with a deformation or indentation 15 which serves as a reference member for determining the angular position of the housing relative to the coupling member B. Also a flap 16 is stamped from the wall of section 2 and bent inwardly at right angles to the axis thereof.

Both housing sections 1 and 2 have at the cable inlet side semicylindrical narrowed extensions 17 and 18 which together form a neck which is flanged outwardly at 19 at its outer edge. In the neck halves are provided cutout portions 20 and 21 in which a key member 22 can be inserted when an unshielded cable is used, which cable is then fixed in the housing by means of key 22. Around the neck 17, 18 of the coupling element, an elastic socket or sleeve 37, made of rubber or the like, can be tightly mounted, if necessary, to seal the entire cable inlet side and to protect that portion of the cable adjacent the flange 19 against rupture due to excessive flexing. Because of its elasticity it can slide over the flange 19, so that it is automatically held thereon by inner groove 39.

Around the above-mentioned major portion of the assembled housing sections 1 and 2 a coil spring 23, formed of spring wire having a circular or polygonal cross-section, is mounted. The spring 23 has a plurality of intimately contacting turns with each and every turn of the spring surrounding the housing and the shell sections forming the housing, not only the spring as a whole. This spring is so dimensioned that under small tension it hugs the housing, so that the outermost ones of its closely adjacent, contacting each other intimately, windings are bordered by the ridge or abutment consisting of the expansion 5, 6 and by the ridge or abutment consisting of the expansion 3, 4. The spring is wound in such a manner that it consists of at least more than one turn or a plurality of turns, so that one end thereof is spaced by more than 360° from its other end.

The coupling member B, which is shown as part of a fixed panel, has a cup-like housing 24 made from sheet metal which is provided with an attachment or mounting flange 25. In the housing is mounted a contact body 26 made of insulating material, in which socket-like contact recesses or sleeves 27, 28 and 29 are arranged, from which soldering terminals 30 extend outwardly. A further soldering terminal 31 can be struck or stamped directly out of the housing 24. Adjacent the end facing the insertion side, the housing 24 is provided with an annular slot or channel 32 into which a cylindrical extension 32' of the housing 1—2 of plug member A can be inserted.

Near the flange 25 resilient tongues 33 are stamped out of the wall of the housing 24 and bent away therefrom. The front ends of these tongues are angularly displaced at 33' inwardly of the housing, so that they contact the housing sections 1, 2 and yieldingly grip the same as the coupling parts are being connected. The dimensions are so chosen that the tongues 33 contact the housing sections 1, 2 before the prongs 9 to 11 are inserted into the sockets 27 to 29. Then, upon further movement of the plug member, the cable connection and the shielding are completed.

The body 26 has a cutout portion 34 into which fits the expansion 15 of the housing half 2 of the plug-like member, so that when the expansion 15 is introduced into the cutout portion 34, the angular relation of parts A and B relative to one another is fixed. In the wall of housing 24 is provided an opening 41, through which extends an inwardly directed, freely movable, folded contact spring 40 connected with the housing and facing in the direction of cutout portion 34. Contact spring 40 is pretensioned so that its inner end, in its normal position, abuts against the metal contact 35 which is extended to form a soldering terminal 36. Housing 24 and soldering terminal 36 are therefore electrically connected, the latter thus being grounded through the former. During insertion of the housing 1, 2 into housing 24, the end of spring 40 lying on contact 35 is raised, so that the connection is broken. This arrangement, therefore, constitutes safety means.

Instead of providing each coupling part only with pin-like or knife-like prongs, they may be provided both with prongs and socket sleeves as desired.

Further modifications result when the resilient element, which holds together the axially split housing sections, besides being resilient in radial and axial direction, as described, is provided with bayonet locking means or with threaded plugs or with a threaded ring. The advantages of the new holding means can thus be combined with the advantages of known holding means. In other words, resilient means are employed to rigidly clamp the housing sections to one another, which resilient clamping means eliminate the need for rigid clamping means and are, of course, much easier to apply and remove by virtue of their inherent resilience.

According to the modification of Fig. 7, the socket-like coupling member B of the embodiment of Figs. 1 to 6 is replaced by a member B' which is constructed in a manner similar to member A of the first described embodiment and comprises two sections 1' and 2' axially separated. The contact body 26' is then held by means of indentations 42 in the housing 1', 2' which is held together by a coil spring 23'. This modification is employed when two free cable ends, rather than one such end and an instrument panel, are to be coupled.

Figure 8:
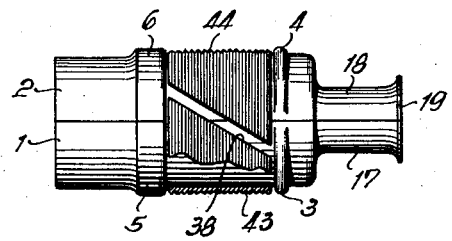
Fig. 8 is a view of a coupling part employing a split ring.

According to the modification of Fig. 8, the housing sections 1, 2 of the coupling member A of the first embodiment are held together by means of an elastic, split ring 43 provided with a diagonal slot 38 rather than a coil spring, the outer surface 44 of the ring 43 being roughened to provide a good gripping surface. The orientation of the slot 38 of this ring at an angle to the axis of the latter ensures that the ring, when turned about its axis during assembly or disassembly, is expanded. This is due to the fact that the ring 43 may be considered as constituting a short coil spring or, in a broad sense, as one winding or turn of such a coil spring. The slot 38, consequently, corresponds to the course of a coil spring winding when pressure is applied to the ring. Thus, when the coupling member A is to be disassembled, for example, the operator grips it at one end, say at the left-hand end in Fig. 8, with his left hand, applies pressure with his right thumb against one edge of the slot and subjects the remainder of the ring to a clockwise torque, i.e., to a turning force directed to his right, with the palm of his right hand. This will cause the slot to be widened and the diameter of the ring increased, facilitating removal of the latter from the coupling member. Substantially the same procedure is followed when the coupling member is being assembled, i.e., when the ring is to be placed onto the coupling halves or sections 1 and 2.

Figure 9:
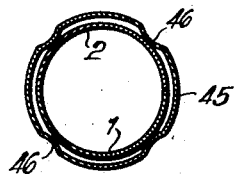
Fig. 9 is a schematic cross section through a further embodiment employing a closed ring, the inner parts being omitted.

In the embodiment of Fig. 9, the coil spring 23 or split ring 43 is replaced by a resilient ring mounted on the housing halves 1 and 2 which surrounds the housing 1, 2 and is generally spaced therefrom and is provided with elastic ribs 46 which contact the housing halves under the resilient force of the ring.

The construction of the shell-like housing section 2, which fixes the radial and angular positions of the coupling body, makes it easy to perform any needed work thereon in an orderly manner. Advantageously, to ensure in the most facile manner registry of the deformation or notch 14 with the depression 13 during assembly of the coupling member A, the housing section 2 is first placed onto a work bench or like support with its interior facing upwardly, i.e., in a position inverted with respect to the position shown in Fig. 1, and all other elements of the coupling member are thereafter superposed onto the section 2. As will be readily realized from the above, the operator has all the parts arranged before him during assembly. He can, therefore, determine at a moment's notice during assembly whether the connecting cable is correctly positioned in the housing neck, whether the shielding is correctly attached, whether the soldering terminals are in order, and whether short circuits are prevented.

Thus, it may be seen that the invention consists of a novel coupling structure for electric cables or conductors in which the housing of the plug member is constructed of a plurality of sections rigidly held together by a resilient element, both the housing of the plug member and the housing of the socket member being provided with means operable to fix the angular relationship of one to the other when the plug member is inserted in the socket member. Each housing is also provided with means to fix the angular and axial position of its respective contact body within the housing, and safety means are provided to render the socket contacts inoperative until the plug member is fully inserted in said socket member.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A coupling device comprising a plug member having at least one electrically conductive prong, a socket member having at least one recess corresponding to and for receiving said prong, said plug member including a longitudinally split housing consisting of a plurality of shell-like sections, each section of said housing having a pair of substantially peripheral abutments on its outer surface and spaced from one another longitudinally of said section, said sections being joined to form said housing, said peripheral abutments being united to form a plurality of substantially circumferential abutments with the major portion of said housing located between said circumferential abutments, and resilient means rigidly clamping said housing sections together and positioned between and in contact with said circumferential abutments, said resilient clamping means covering said major portion of said housing and being immobilized against axial movement longitudinally of said housing securing said section against both axial and radial displacements relative to one another and relative to said prong during maintenance of said plug member in assembled condition, said resilient means including a coil spring having a plurality of turns, each turn of said spring surrounding said housing.

2. A coupling according to claim 1, said ridge on said contact body having a deformation therein and said groove in said housing having a corresponding deformation therein, said deformations coacting to fix the angular relationship of said body in said housing.

3. A coupling according to claim 1, said socket member being provided with an annular slot extending coaxially therein, said housing having a cylindrical extension surrounding said prong for insertion in said annular slot, and means on said socket member extending into said slot at a location in advance of the insertion end of said recess resiliently engaging and frictionally gripping said extension before said prong is fully inserted into said recess.

4. A coupling according to claim 1, each of said sections having an extension of reduced diameter at the end remote from said prong forming a neck of reduced diameter on said housing for insertion of a cable therethrough into said housing, and a resilient sleeve mounted on said neck in sealingly surrounding relation to said cable.

5. A coupling comprising a plug member provided with a contact body in which are mounted a plurality of electrically conductive prongs, a socket member having a plurality of contact recesses each corresponding to and receiving one of said prongs, said plug member including a substantially cylindrical housing axially split into a plurality of sections and having two axially spaced circumferential abutments on its external surface, the major portion of said housing being encompassed between said circumferential abutments, said housing also having a first cylindrical extension coaxial therewith at the end adjacent said prongs and a second substantially cylindrical extension at the other end and of smaller diameter than the remainder of the housing, through which second extension a cable is insertable into the housing for connection to said prongs, and resilient means surrounding said major portion of said housing and lying between and contacting said spaced abutments and rigidly clamping said sections to one another to prevent axial and radial displacements of said sections of said housing relative to one another as well as axial displacement of said contact body with said prongs relative to said housing, said resilient means including a coil spring having a plurality of turns, every turn of said spring surrounding said housing, said socket member being provided with an annular slot into which said first extension fits, resilient gripping means integrally formed in said socket member, said resilient gripping means comprising an inwardly extending deformation in said socket member and a respective deformation in said plug member and extending into said slot yieldably engaging and gripping said first extension before said prongs fully enter into said recesses, and safety means in said socket member normally closed and opened by said first extension upon insertion thereof into said slot, said safety means comprising a spring and a contact member in said socket, disengaged from one another during the sliding movement of the plug into said socket.

6. A coupling comprising a plug member, said plug member including a longitudinally split housing having a plurality of shell-like sections, each section of said housing having a pair of substantially peripheral abutments on its outer surface and spaced from one another longitudinally of said section, said abutments being formed by an outward deformation of each of said sections defining a corresponding circumferential groove on the inner surface of said housing with the major portion of said housing located between said circumferential abutments, resilient means rigidly clamping said housing sections together and positioned between and in contact with said circumferential abutments, said resilient clamping means comprising a coil spring formed with a plurality of intimately contacting turns and in contact with said circumferential abutments, each of said turns completely surrounding said housing, said resilient clamping means covering said major portion of said housing and being immobilized against axial movement with respect to said housing securing said sections against both axial and radial displacement, and a cylindrical contact body of insulating material in said housing abutting with its surface at least a part of the inner surface of said housing, said cylindrical body having a circumferential ridge portion fitting said grooves and coacting therewith to secure said body against axial displacement in said housing.

7. A coupling device comprising a plug member having at least one electrically conductive prong, a socket member having at least one recess corresponding to and for receiving said prong, said plug member including a longitudinally split housing consisting of a plurality of shell-like sections, each section of said housing having a pair of substantially peripheral abutments on its outer surface and spaced from one another longitudinally of said section, said sections being joined to form said housing, said peripheral abutments being united to form a plurality of substantially circumferential abutments with the major portion of said housing located between said circumferential abutments, resilient means rigidly clamping said housing sections together and positioned between and in contact with said circumferential abutments, said resilient clamping means covering said major portion of said housing and being immobilized against axial movement longitudinally of said housing securing said section against both axial and radial displacements relative to one another and relative to said prong during maintenance of said plug member in assembled condition, said sections comprising a substantially semicylindrical, unitary, metallic shell, one of said peripheral abutments on each of said shells being formed by an outward deformation of said shell defining a corresponding circumferential groove on the inner surface of said housing upon assembly thereof, and a contact body in which said prong is fixedly mounted in said housing, said body being provided with a circumferential ridge to fit into said groove and to coact therewith to secure said body against axial displacement in said housing.

References Cited in the file of this patent

UNITED STATES PATENTS

| | | |
|---|---|---|
| 612,123 | Schwedtmann | Oct. 11, 1898 |
| 1,806,548 | Rabezzana | May 19, 1931 |
| 2,197,426 | Del Camp | Apr. 16, 1940 |
| 2,346,831 | Drury | Apr. 18, 1944 |
| 2,386,000 | McQuiston | Oct. 2, 1945 |
| 2,443,975 | Baker | June 22, 1948 |
| 2,496,208 | Hasselbaum | Jan. 31, 1950 |
| 2,566,993 | Parsons | Sept. 4, 1951 |
| 2,570,800 | Hamm | Oct. 9, 1951 |
| 2,626,975 | Rockwell et al. | Jan. 27, 1953 |
| 2,664,475 | Harlin | Dec. 29, 1953 |
| 2,765,449 | Tuchel | Oct. 2, 1956 |